United States Patent [19]

Ogawa et al.

[11] 3,792,342
[45] Feb. 12, 1974

[54] APPARATUS FOR MEASURING THE RESISTANCE OF A VARIABLE RESISTANCE ELEMENT LOCATED IN A ROTATING BODY

[75] Inventors: Shozo Ogawa, Otsu; Kiyoshi Ametani, Tokyo; Kenro Samejima, Takatsuki, all of Japan

[73] Assignee: Toray Engineering Co. Ltd., Osaka, Japan

[22] Filed: Sept. 8, 1972

[21] Appl. No.: 287,529

[52] U.S. Cl. ................. 323/68, 73/351, 323/75 J, 323/94, 324/62
[51] Int. Cl. ............................................. G05d 23/00
[58] Field of Search .... 323/52, 53, 54, 84, 90, 75 J, 323/68, 69, 71, 94; 73/350, 351, 362 AR, 362.1; 336/120, 122, 123; 324/136, 140, 154, 62

[56] References Cited
UNITED STATES PATENTS 3,457,495 7/1969 Bailey ................................. 323/53
2,592,101 4/1952 Aiken ................................. 323/75 J
3,701,281 10/1972 Sogner ................................. 73/351

*Primary Examiner*—Gerald Goldberg

[57] ABSTRACT

Characteristic features in the apparatus according to the invention mainly consist of improvement of a rotary transformer, a bridge circuit and a detecting means. With these features the measurement of the value of the resistance of a variable resistance element provided in a rotating body can be carried out with a high degree of accuracy independent of the effect of leakage impedance or temperature variation of the rotary transformer. Further, the above-mentioned measurement is carried out easily, and with both high reliability and interchangeability. Also, the control of a plurality of heat rollers utilized in the apparatus can be easily carried out with a central controlling apparatus.

29 Claims, 17 Drawing Figures

APPARATUS FOR MEASURING THE RESISTANCE OF A VARIABLE RESISTANCE ELEMENT LOCATED IN A ROTATING BODY

The present invention relates to an apparatus for measuring precisely the resistance of a variable resistance element located in a rotating body, and furthermore, to an apparatus for measuring or controlling the temperature of a rotating body which provides a temperature sensitive resistance element in the rotating body, estimates or controls the temperature of the rotating body in a non-contact condition from the position of repose with high accuracy, high reliability and interchangeability.

In various industries, it is often necessary to measure or control precisely conditions, such as temperature, distortion, pressure, chemical composition, and so on, on a rotating body.

Usually, a variable resistance element related to the above-mentioned conditions is used conveniently for measuring these conditions.

The present invention is useful in these cases. An explanation of the present invention will be given hereinafter for the case of measuring or controlling of the temperature of a heat roller, to which, however, the scope of this invention is not limited.

An apparatus having such a high performance is necessary, particularly, in a heat roller used in spinning, drawing and heat setting in the synthetic fiber industry.

In the usual apparatus used in the synthetic fiber industry, the above-mentioned heat roller is provided on each spindle of a machine, and the difference in the temperature of the heat roller among spingles affects the yarn quality. Because of this, in addition to high degree of accuracy, the following conditions must be taken into consideration for a temperature measurement apparatus:

a. the measurement must be reproducible;
b. the measurement must be interchangeable;
c. the accuracy of the measurement must be constant regardless of time;
d. centralized control of the temperature is possible;
e. maintenance of the apparatus is easily accomplished;
f. the number of the electronic components provided in the rotating body should be a minimum;
g. influence of the ambient temperature should be avoided;
h. the apparatus should be inexpensive to manufacture.

A conventional apparatus used for the above-mentioned purposes is described, for example, in U. S. Pat. Application, Ser. No. 3,457,495, entitled "Error circuit with means for reducing excitation currents for rotating transformer input" filed on Mar. 9, 1967, by General Electric Company. However, this apparatus is not sufficient with regard to the above-mentioned items (a), (b), (c), (d) and (g), and, therefore is not suitable for the synthetic fiber industry.

The object of the present invention relates to providing an apparatus for controlling the temperature of a heat roller which overcomes the above-mentioned inconveniences.

Another object of the present invention relates to providing an apparatus for controlling the temperature of a heat-roller which estimates precisely the value of the temperature of the heat roller.

A further object of the present invention relates to providing an apparatus for controlling the temperature of a heat roller which can measure the value of the temperature sensitive resistance element provided in the heat roller, independently of the leakage impedance of the rotary transformer, independently of a variation of the ambient temperature in the rotary transformer or a variation in the length of the cable connecting the stationary winding of the rotary transformer to a measuring bridge.

A still further object of the present invention relates to providing an apparatus for controlling the temperature of a heat roller which has an improved rotary transformer, a bridge circuit and a detecting means.

Further features and advantages of the present invention will be apparent from the ensuing description and the accompanying drawings to which, however, the scope of the invention is in no way limited:

Figure 1:
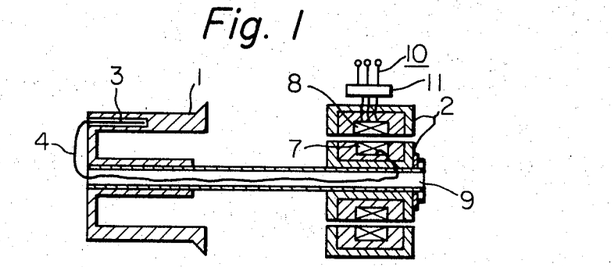
FIG. 1 is a cross sectional view illustrating the relation between a heat roller and a rotary transformer.
Figure 2:
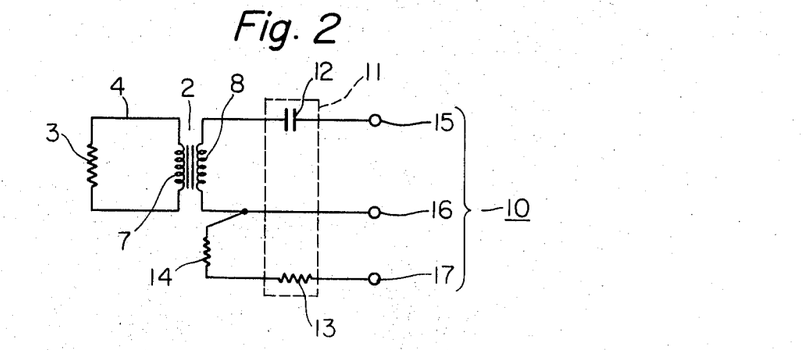
FIG. 2 is a schematic diagram of a rotary transformer portion.

Referring to FIG. 1, a heat roller 1 and a rotary transformer 2 are fixed on the same axis 9 which is rotated by a driving mechanism not shown in this figure. A variable resistance element 3 of which the resistance is sensitive to the temperature of the heat roller 1, is composed of a platinum resistant material or thermister for measuring the temperature, the former being more suitable from the point of view of interchangeability. The variable resistance element 3 is connected, via the connecting means 4, in series with a rotary winding 7 of the rotary transformer 2. The stationary winding 8 is connected via a junction box 11 to output terminals 10. These output terminals 10 are connected via a bridge circuit 30 (see FIG. 4) to a heater 33 which heats the heat roller 1. Referring to FIG. 2, a characteristic feature of the present invention is that a compensating element 14 having a bifilar winding which has its wires consisting of the same material as the windings 7 and 8 and gives the same resistance as the leakage resistance of the rotary transformer 2 is superimposed on the stationary winding 8, as one resistance element. One of the terminals of the stationary winding 8 and the compensating element 14 are connected commonly, then the three connecting means, as shown in FIG. 2, are connected via the junction box 11 to the group of output terminals 10. The junction box 11 is provided on the stationary winding 8 of the rotary transformer 2 and includes a capacitor 12 and an auxiliary resistance element 13. One terminal of the capacitor 12 is connected to one terminal of the stationary winding 8, and another terminal of the capacitor 12 is connected to an output terminal 15. One terminal of the auxiliary resistance element 13 is connected via the compensating element 14 to another terminal of the stationary winding 8, and another terminal of the auxiliary resistance element 13 is connected to an output terminal 17. It is preferably that the capacitance of the capacitor 12 is selected nearly equal to the leakage reactance of the rotary transformer 2. More precisely defining the method of selecting the capacitance of the capacitor 12, a value of impedance, as viewed toward the left side across the terminals 15 and 16, is selected having a pure resistance when the value of the variable resistance element 3 is settled on a center value of its measuring range.

Figure 3:
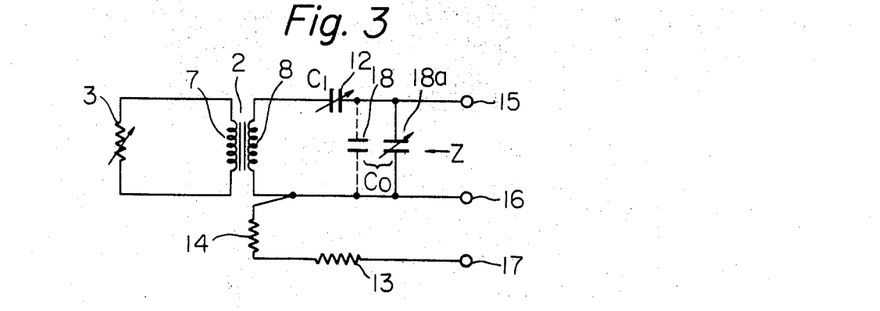
FIG. 3 illustrates a modified embodiment of the rotary transformer portion shown in FIG. 2.

In a circuit shown in FIG. 3, the value of the resistance element 3 is variable, and the capacitor 12 is connected between one terminal of the stationary winding 8 and the output terminal 15. The capacitor 18a is connected across the output terminals 15 and 16, and the capacitance 18 is interposed across lines to terminals 15 and 16. The term "capacitor" as used herein refers to a conventional fixed or variable electrical component, while the terms "capacitance" and "capacitance element" refer to all capacitive elements present in the circuit, including stray capacitance and fixed or variable capacitors. An impedance Z, viewed toward the left side across terminals 15 and 16, is measured using a bridge circuit. When the value of the capacitor 12 and the sum of the values of the capacitor 18a and capacitance 18 are suitably selected, reaching $C_1$ and $C_o$ respectively, the value of the reactance component of the impedance Z becomes minimum and a constant value during the change of the value of the resistance element 3. Thus, a real component of the impedance Z becomes precisely proportional to the resistance of the resistance element 3. The methods shown in FIGS. 2 and 3 should be selected according to a bridge circuit applied and its effect will be explained in detail hereinafter.

Next, an explanation will be given of the functional effect of the compensating element 14. As the rotary transformer 2 is used near the heat roller 1, the temperature of the windings 7 and 8 of the rotary transformer 2 rises. As a result of this, the winding resistance of these windings 7 and 8 varies, and the measured value of the temperature of the heat roller 1 rises in appearance. For overcoming this inconvenience, the compensating element 14 is provided so that the value of its resistance has the same variation due to ambient temperature as the equivalent series resistance of the rotary transformer 2. By applying such a rotary transformer system on the bridge circuit, hereinafter described, the influence of the ambient temperature variation in the rotary transformer 2 can be completely removed.

The auxiliary resistance element 13 is used for providing interchangeability to the rotary transformer 2. When a plurality of rotary transformers 2 of which the rotary windings 7 are connected across the resistance elements 3 respectively, are provided and the value of every resistance element 3 is selected in the center of the measuring range, the value of each individual resistance viewed respectively toward the left side across terminals 15 and 16 should be equal. This is due to the inequality in the length of the winding 7 or 8 among the rotary transformers 2, that is, due to the inequality in the equivalent series resistance among the rotary transformers 2. For compensating for this phenomena, the auxiliary resistance element 13 is inserted as shown in FIGS. 2 and 3, so that the above-mentioned resistances become equal to other each.

Figure 4:
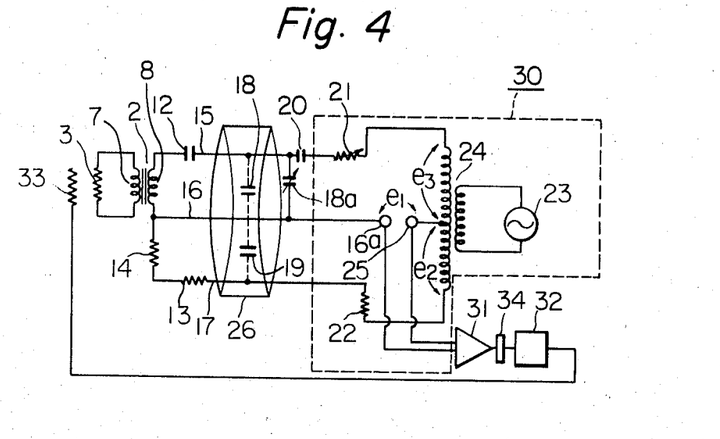
FIG. 4 shows one embodiment of the apparatus for controlling the temperature of the heat roller.

FIG. 4 shows the method for controlling the temperature of a heat roller 1 by using the rotary transformer 2 shown in FIG. 3. The rotary transformer 2 and a bridge circuit 30 are connected to each other with a cable 26. The capacitances 18 and 19 are placed across lines 15 and 16, and lines 16 and 17, respectively. The sum of the values of the capacitance 18 and the capacitor 18a corresponds to the capacitance $C_o$ shown in FIG. 3. A source voltage for the bridge circuit 30 is supplied via a transformer 24 from the 5 to 15 KC AC voltage supply 23. The secondary voltage of the transformer 24 is divided into $e_2$ and $e_3$ by the tap 25. One terminal of the secondary coil of the transformer 24 is connected via a variable resistor 21, a capacitor 20, a line 15 and the capacitor 12, to one terminal of the stationary winding 8 of the rotary transformer 2. It is evident, in referring to FIG. 4, that the capacitors 12 and 20 form the series branches of a T-network, and the capacitor 18a and capacitance element 18 forms the shunt branch of the T-network. Here, the combination of the resistor 21, the capacitors 20 and 12, the capacitance elements 18 and 18a, and the stationary winding 8 form one arm of the bridge circuit 30. Another terminal of the secondary coil of the transformer 24 is connected via a resistor 22, the line 17, the auxiliary resistance element 13 and the compensating element 14, to the junction of the line 16 and another terminal of the stationary winding 8 of the rotary transformer 2. Here, the combination of the resistor 22, the elements 13 and 14, and the capacitance 19 forms another arm of the bridge circuit 30. When in addition to the adjustment of the values of the capacitance 18 and the capacitor 18a, as set forth in FIG. 3, the value of the capacitor 20 is selected suitably, an impedance viewed toward the left side across the junction of the capacitor 20 and the resistor 21 and the line 16 becomes pure resistance regardless of the value of the variable resistance element 3. When, furthermore, the sum of the resistances of the elements 13 and 14 is sufficiently small, compared with the reactance due to the capacitance 19, the bridge circuit 30 forms a pure resistance bridge and, a deviation voltage $e_1$ to appear across the line 16a and the tap 25 becoms zero at a certain value of the variable resistance element 3.

The deviation voltage $e_1$ is applied to a detecting means where it is amplified by an amplifier 31, and detected by a phase detector 34. Then the output of the phase detector 34 is supplied to an SCR controller 32 for controlling the power delivered to a heater 33 for heating the heat roller 1, which in turn heats the variable resistance element 3 for measuring the temperature of the heat roller 1. As mentioned above, a loop for automatically controlling the temperature of the heat roller 1 can be formed. In another detecting means, the input to the SCR controller 32 can be provided by comparing the magnitude of the voltage drop across one arm above-mentioned with the magnitude of the voltage drop across another arm above-mentioned.

The advantages of the above-mentioned apparatus are set forth below:

a. Variation of the winding resistance due to an ambient temperature rise in the rotary transformer 2 has no influence on the balanced condition of the bridge circuit 30, correct control of the temperature of the heat roller 1 can be carried out;

b. As the bridge circuit 30 acts as a pure resistance bridge, its circuit and function can be simplified;

c. The bridge circuit 30 can be moved away from the rotary transformer 2 by using a cable 26;

d. Since the sum of the resistances of the resistor 21 and the variable resistance element 3 is kept constant, the sensitivity of the bridge circuit 30 is also constant, thereby the sensitivity of the alarm device, not shown, is also constant, which detects and alarms a deviation in the temperature of the heat roller 1.

Figure 5:
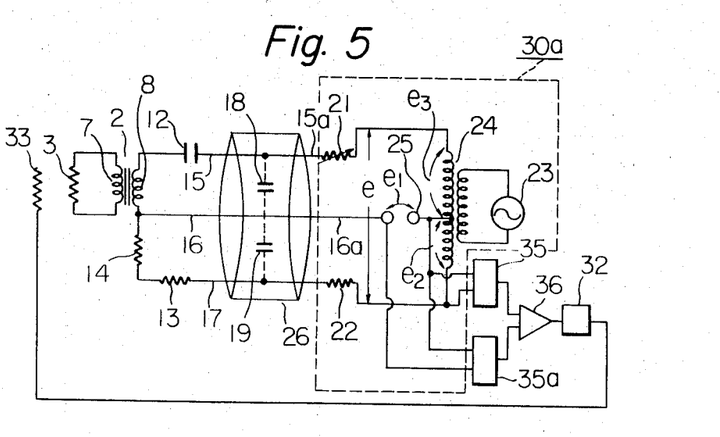
FIG. 5 shows another embodiment of the apparatus for controlling the temperature of the heat roller.

FIG. 5 shows another embodiment of the apparatus of the present invention and illustrates a method for controlling the temperature of the heat roller 1 by using the rotary transformer shown in FIG. 2. Referring to FIG. 5, the construction of the bridge circuit 30a is the same as that shown in FIG. 4. However, in FIG. 5, the reference voltage $e_2$, across the tap 25 and one terminal of the secondary coil of the transformer 24, and the voltage $e_1$ across the tap 25 and the line 16a, are respectively rectified by rectifiers 35 and 35a. Here, the voltage $e_1$ consists of the vector sum of the reference voltage $e_2$ and the voltage drop across a resistance element 22, the auxiliary resistance element 13 and the compensating element 14. The rectified outputs of the rectifiers 35 and 35a are respectively supplied to differential input terminals of a PID controller 36. (i.e., proportional, integral and derivative control device) The rectifiers 35 and 35a and the PID controller 36 form a detecting means. The output of the PID controller 36 is supplied via the SCR controller 32 to the heater 33. When a value of the variable resistance element 3 becomes a predetermined value, the input signal to the PID controller 36 becomes zero in a balanced condition. The circuit shown in FIG. 5 is not a pure resistance bridge, because the impedance viewed toward the left side across terminals 15a and 16a of the cable 26 is composed of a resistance component and a reactance component. Therefore, the voltage $e_1$ does not become zero even when the value of the variable resistance element 3 is adjusted. Also, a reactance component of the above-mentioned impedance varies in accordance with the value of the variable resistance element 3. In the present case, the circuit shown in FIG. 5 can simply achieve measurement only of the value of the resistance component of the above-mentioned impedance regardless of the reactance component of the above-mentioned impedance.

Figure 6A:
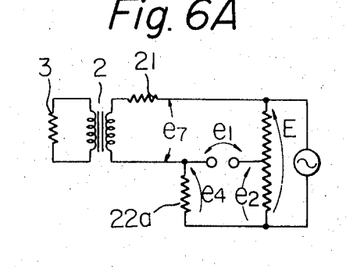
FIGS. 6A - 6B show equivalent circuits explaining a function of the apparatus shown in FIG. 5.
Figure 6B:
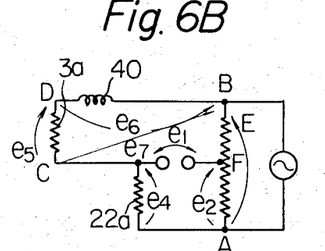
Figure 6C:
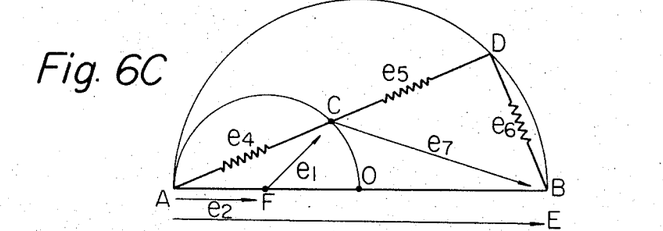
FIG. 6C shows a vector diagram explaining a function of the circuit shown in FIG. 6B.

Next, the principle of the bridge according to the present invention will be given. FIG. 6A shows an equivalent diagram of the case shown in FIG. 5; in FIG. 6B, the variable resistance element 3, the rotary transformer 2 and the resistor 21 are represented by a series circuit of a resistance $3a$ and an inductance 40, and the resistance element 22, the auxiliary resistance element 13 and the compensating element 14 are represented by a resistance $22a$. FIG. 6C is a vector diagram explaining the function of the bridge circuit shown in FIG. 6B. In FIG. 6C, the points A, B, C, D and F correspond respectively to the points A, B, C, D and F in FIG. 6B, and a vector $e_6$ is a voltage drop across an inductance 40. Vectors $e_4$ and $e_5$ are respectively the voltage drops across the resistances $22a$ and $3a$, and these vectors are crossed with the vector $e_6$ at a right angle. Then, the point D exists on the circle with the diameter AB and the center O which is the middle point of AB. When the value of the resistance $3a$ becomes equal to the value of the resistance $22a$, the point C becomes a middle point of AD. Now, with a middle point of AB designated O, the triangle ACO becomes a right-angled triangle. And when F is a middle point of AO, FC equals AF, that is, $|e_1| = |e_2|$. That is, when either of the resistance $3a$ or $22a$ is adjusted so that $|e_1| = |e_2|$ the value of resistance $3a$ becomes equal to the value of resistance $22a$. When the capacitance of the capacitor 12, the leakage reactance of the rotary transformer 2, or the frequency of the AC voltage supply 23 is selected so that an approximately resonant condition is given, the point C in FIG. 6C gets near the point O and, as a result, the sensitivity of the bridge circuit 30a becomes maximum.

Figure 7:
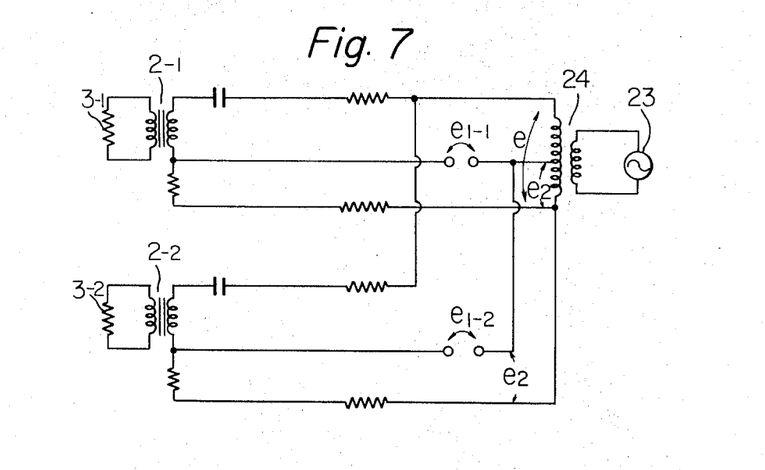
FIG. 7 shows an embodiment of the apparatus for controlling a plurality of heat rollers.

If the value of the resistance $22a$ is kept constant, and the value of the variable resistance element 3 is changed by heating the heat roller 1, so that $|e_1|$ becomes equal to $|e_2|$, the resistance $3a$ becomes equal to the value of the resistance $22a$ and thus a balanced condition exists. Accordingly, if the value of the resistor 21 in FIG. 6A is increased, the bridge is balanced with a decrease in value of the variable resistance element 3. Thereby, the sensitivity of the bridge circuit $30a$ is maintained constant regardless of changing the temperature of the heat roller 1. The advantage of the bridge circuit $30a$ shown in FIG. 5 is that the value of the variable resistance element 3 can be measured without error regardless of the variation of the inductance 40, that is, regardless of the lack of uniformity in the reactance of the rotary transformer 2., the capacitor 12 and the capacitance 18. Another advantage of this bridge is that a common temperature can be settled on for the purpose of controlling a multi-point temperature. Referring to FIG. 7, a common source voltage in a bridge is applied to two rotary transformers 2–1, 2—2 and two variable resistance elements 3–1, 3–2.

Then, the elements 3–1 and 3–2 are adjusted so that a voltage $|e_{1-1}|$ produced through the rotary transformer 2–1, and a voltage $|e_{1-2}|$ produced through the rotary transformer 2–2 become equal to the common voltage $|e_2|$, respectively. As a result of this, both resistance of the variable resistance elements 3–1 and 3–2 have the same value. This relation can be extended to the case of more than two heat rollers.

Figure 8:
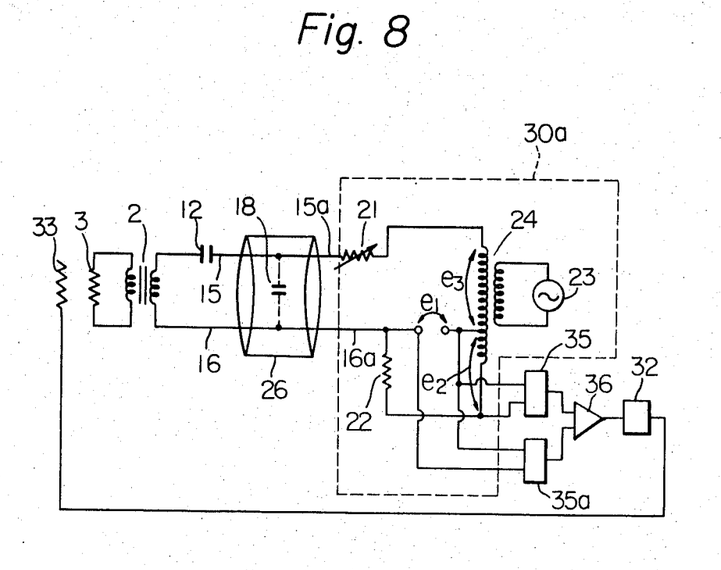
FIG. 8 shows a simplified embodiment of the apparatus shown in FIG. 5.

FIG. 8 shows a simplified embodiment of the apparatus shown in FIG. 5.

Referring to FIG. 8, the auxiliary resistance element 13, the compensating element 14 and the line 17 are omitted, and one terminal of the resistance 22 is connected to the line 16a. This apparatus can be used when the influence of the variation in the ambient temperature in the rotary transformer 2 or the lack of uniformity in the equivalent series resistances among the rotary transformers 2 are small.

Figure 9A:
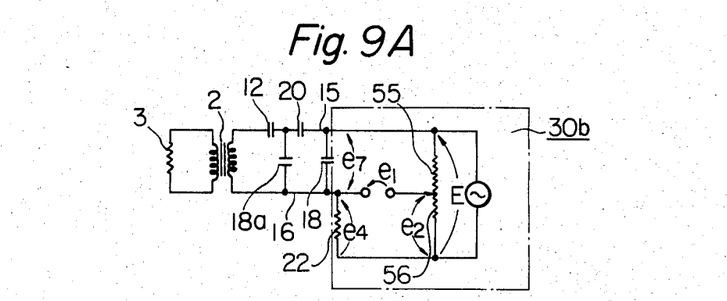
FIGS. 9A - 9C show another embodiment of the apparatus according to the present invention.
Figure 9B:
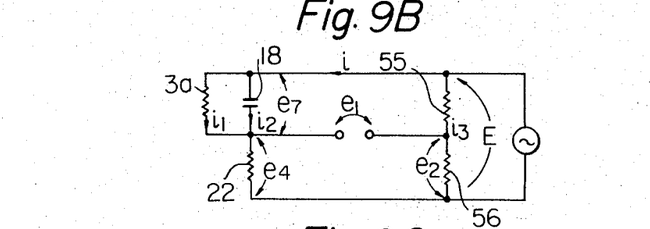
Figure 9C:
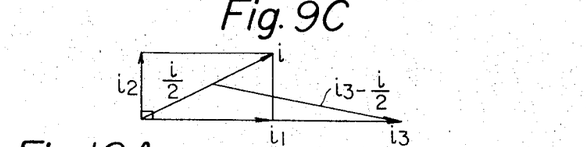

FIGS. 9A, 9B and 9C show a modified embodiment, of the admittance type, of FIG. 4. Referring to FIG. 9A, a resistance bridge 30b and the rotary transformer 2 are connected to each other by lines 15 and 16. When capacitors 12, 18a and 20 are suitably provided between the rotary transformer 2 and the resistance bridge 30b as shown in FIG. 9A, an impedance, viewed toward the left side across the lines 15 and 16, becomes a pure resistance. Therefore the equivalent circuit of FIG. 9A can be shown in FIG. 9B where a value of a capacitance 18 varies in accordance with the length of the cable. When the resistor 22 is of a very small value compared with the resistance $3a$, and a reactance of the capacitance 18, that is, the voltage $e_4$ across the resistor 22, is very small compared with the voltage $e_7$, the relation among vectors $i_1$, $i_2$ and $i_3$ can be shown in FIG. 9C. When we consider a vector $i_3 - (i/2)$, a necessary condition for having a relation $|i_3 - (i/2)| = i/2$ is $i_1 = i_3$ as is clear from FIG. 9C. When the values of the resistor 22 and the resistance element 56 are selected so that they are sufficiently small and the half of value of the resistance element 56 is selected as the value of the resistor 22, the voltage $e_4$ is proportional to $i/2$; the voltage $e_2$ is proportional to $i_3$ and; the voltage $e_1$ in FIG. 9B is proportional to $i_3 - (i/2)$. Then the value of the resistance element 55 is adjusted so that the relation $|e_1| = |e_4|$ is held, and the bridge $30b$ is balanced when the value of the resistance $3a$ becomes equal to the value of the resistance element 55. Therefore, the value of the resistance $3a$ is read with a value of the resistance element 55. This bridge shown in FIG. 9A becomes balanced at the above-mentioned condition regardless of the variation in the value of the capacitance 18 so that it is suitable in the case where a long cable is used.

Figure 10A:
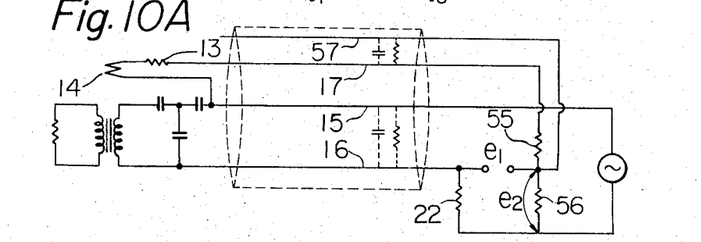
FIGS. 10A and 10B show a modified embodiment of the apparatus shown in FIGS. 9A - 9C.
Figure 10B:
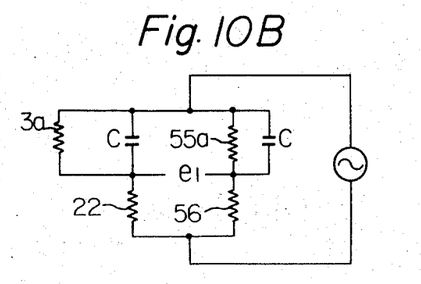

FIGS. 10A and 10B show a modified embodiment of the apparatus shown in FIGS. 9A – 9C. Referring to FIG. 10A, a compensating element 14 and an auxiliary resistance element 13 are connected in series with the resistance element 55 the ambient temperature variation in the rotary transformer 2 being removed. A line 57 is provided in addition to the lines 15, 16 and 17. One end of the line 57 is open-circuited and its other end is connected to a junction point of the resistance elements 55 and 56. A capacitance and a leakage resistance across the lines 57 and 17 are selected respectively to correspond to a capacitance and a leakage resistance across the lines 15 and 16 and are inserted in parallel with the resistance element 55. An equivalent circuit of FIG. 10A is shown in FIG. 10B. When the resistor 22 is equal to the resistance element 56, the voltage $e_1$ becomes zero. Thus, the value of the resistance $3a$ can be detected with the usual alternate current bridge as shown in FIG. 10A, and also the balancing condition can be obtained by adjusting only the resistance element 55. The apparatus is consequently simplified.

Next, the method of detecting the outputs of the bridge $30a$ or $30b$ will be given. As already described, the detecting method consists in deciding whether the magnitudes of two alternate current voltages (whose frequencies are identical) $e_1$ AND $e_2$ are equal to each other. For this purpose, it is sufficient to compare the two direct current signals obtained by rectifying respectively the AC voltages $e_1$ and $e_2$ by diodes. However, when the rectified voltages are compared with each other drift of the DC amplifier becomes a problem especially, when the voltages $e_2$ and $e_1$ are very small. For example, in the case of the bridge shown in FIG. 10A, the difference of gains of the two amplifiers amplifying these small voltages $e_2$ and $e_1$ before rectification produces a serious error. For overcoming this problem, a chopper amplifier is conventionally used. However it is very expensive. According to the present invention, above-mentioned disadvantages are resolved in the following manner.

Figure 11:
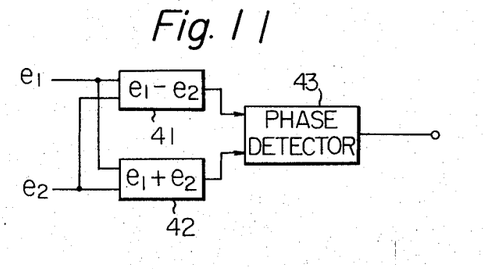
FIG. 11 shows an example of a detecting means used for the apparatus of the present invention.

One example of detecting means is shown in FIG. 11. Referring to FIG. 11, 41 is means for making a difference between $e_1$ and $e_2$ and 42 is means for making a sum of $e_1$ and $e_2$. The outputs of the means 41 and 42 are supplied to a phase detector 43 for making a scalar product of $(e_1 - e_2)$ and $(e_1 + e_2)$. As the scalar product of $(e_1 - e_2)$ and $(e_1 + e_2)$ is shown:

$$(e_1 - e_2) \cdot (e_1 + e_2) = |e_1|^2 - |e_2|^2$$

then, the fact that the scalar product $(e_1 - e_2) \cdot (e_1 + e_2) = 0$ means that $|e_1| = |e_2|$. An advantage of the detecting means shown in FIG. 11 is that it is more stable and inexpensive than the method using a chopper amplifier because $e_1 - e_2$ can be amplified to a desired level as an alternating current.

Figure 12:
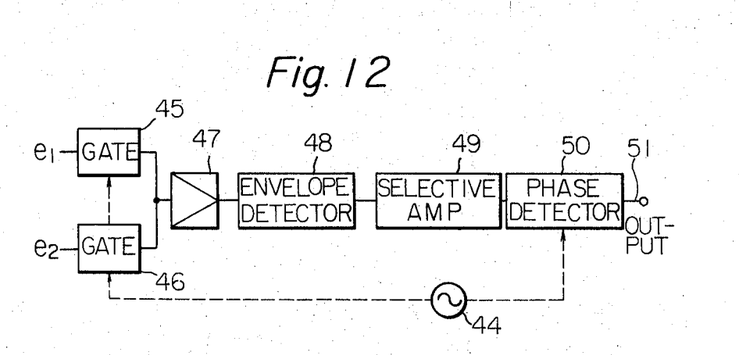
FIG. 12 shows another example of a detecting means used in the apparatus of the present invention.

Another method of detecting means is shown in FIG. 12. Referring to FIG. 12, input voltages $e_1$ and $e_2$ are applied respectively to gates 45 and 46, which are switched alternately in synchronization with the AC voltage source 44 and arrange alternately voltages $e_1$ and $e_2$ for a given period of time into sequential waves. The outputs of the gates 45 and 46 are supplied via an amplifier 47 to an envelope detector 48 for producing an envelope detected of the above-mentioned sequential waves. The output of the envelope detector 48 is amplified by a selective amplifier 49 tuned to the frequency of the source 44 and then detected by a phase detector 50 synchronized with the source 44. Then, an output 51 shows the difference between $e_1$ and $e_2$. An advantage of the detecting means shown in FIG. 12 is that it has no drift and it is characterized by high reliabilty because no direct current amplifier is utilized. It is therefore, very suitable for the apparatus using the bridge of the present invention.

What is claimed is:

1. An apparatus for measuring the resistance of a variable resistance element located in a rotating body, the resistance of said variable resistor element being dependent upon a physical condition to which the rotating body is subjected, said apparatus comprising:
    1. a circuit comprising in series, a first resistance element, a capacitor, and a stationary winding of a rotary transformer, said transformer having a rotary winding connected across said variable resistance element, an AC voltage applied across said circuit,
    2. means for producing a reference voltage in phase with said AC voltage;
    3. detecting means for comparing the magnitude of said reference voltage with the magnitude of the vector sum of voltage drops across said first resistance element and said reference voltage, said detecting means producing a signal for controlling said physical condition.

2. An apparatus according to claim 1 wherein the capacitance of said capacitor, the leakage reactance of said rotary transformer, and the frequency of said AC voltage form an approximately resonant condition.

3. An apparatus according to claim 1, for use with another similar appparatus, wherein said circuit comprises in series,
    a first circuit comprising in series said capacitor and said stationary winding of said rotary transformer, and
    a second circuit comprising in series an auxiliary resistance element and said first resistance element, said auxiliary resistance element compensating inequality in the equivalent series resistance of the rotary transformers of said apparatuses; said detecting means being connected to compare the magnitude of said reference voltage and the magnitude of the vector sum of the voltage drops across said second circuit and said reference voltage.

4. An apparatus according to claim 1 wherein said circuit comprises in series,
a first circuit comprising in series said capacitor and said stationary winding of said rotary transformer, and
a second circuit comprising in series a compensating element and said first resistance element, said compensating element having approximately the same temperature coefficient of resistance as the equivalent series resistance of said rotary transformer, said compensating element being located in the proximity of said rotary transformer, said detecting means being connected to compare the magnitude of said reference voltage and the magnitude of the vector sum of voltage drops across said second circuit and said reference voltage.

5. An apparatus according to claim 1 for use with another similar apparatus, wherein said circuit comprises in series,
a first circuit comprising in series said capacitor and said stationary winding of said rotary transformer, and
a second circuit comprising an auxiliary resistance element which compensates inequality in the equivalent series resistance of the rotary transformers of said apparatuses, a compensating element having approximately the same temperature coefficient of resistance as an equivalent series resistance of said rotary transformer and said first resistance element, said compensating element being located in the proximity of said rotary transformer; said detecting means being connected to compare the magnitude of said reference voltage and the magnitude of the vector sum of a voltage drop across said second circuit and said reference voltage.

6. An apparatus according to claim 1 further including a second capacitance element connected across said capacitor and said stationary winding of said rotary transformer.

7. An apparatus according to claim 4 wherein said compensating element includes a non-inductive winding formed of wires, said wires being of the same material as wires forming said rotary winding of said rotary transformer.

8. An apparatus according to claim 5, wherein said compensating element includes a non-inductive winding formed of wires, said wires being of the same material as wires forming said rotary winding of said rotary transformer.

9. An apparatus according to claim 6, wherein the values of the reactance of the combination of said capacitor, said second capacitance element, and the leakage reactance of said rotary transformer form an approximately resonant condition.

10. An apparatus according to claim 1 wherein said detecting means includes means for arranging alternately said reference voltage and said vector sum for a given period of time into sequential waves, means for detecting said sequential waves and producing an envelope, a selective amplifier for amplifying said envelope, and a phase detector for detecting the output of said selective amplifier.

11. An apparatus according to claim 1 wherein said detecting means includes a first means for producing a difference between said reference voltage and said vector sum, a second means for producing the sum of said reference voltage and said vector sum, and a third means for producing a scalar product of outputs of said first and second means.

12. An apparatus for measuring the resistance of a variable resistance element located in a rotating body by means of a rotary transformer and being adapted to be interconnected to other apparatuses which also include rotary transformers, and apparatus comprising:
a circuit comprising in series,
a first circuit comprising in series a capacitor and a stationary winding of a rotary transformer, said rotary transformer having a rotary winding connected across said variable resistance element, the resistance of said variable resistance element being determined by a physical condition on said rotating body which is to be detected, and
a second circuit including an auxiliary resistance element for compensating for inequality in the equivalent series resistance of said rotary transformer and the equivalent series resistance of said rotary transformers of said other apparatuses, a compensating element having approximately the same temperature co-efficient of resistance as said equivalent series resistance of said rotary transformer, and a resistance element, said compensating element being located in proximity to said rotary transformer;
an AC voltage supply for providing an AC voltage across said circuit;
means for producing a reference voltage in phase with said AC voltage supplied across said circuit;
detecting means for comparing the magnitude of said reference voltage with the magnitude of the vector sum of a voltage drop across said second circuit and said reference voltage, said detecting means producing a signal for controlling said condition.

13. An apparatus according to claim 12 wherein said detecting means includes means for arranging alternately said reference voltage and said vector sum for a given period of time into sequential waves, means for detecting said sequential waves and producing an envelope, a selective amplifier for amplifying said envelope, and a phase detector for detecting the output of said selective amplifier.

14. An apparatus according to claim 12 wherein said detecting means includes a first means for producing a difference between said reference voltage and said vector sum, a second means for producing the sum of said reference voltage and said vector sum, and a third means for producing a scalar product of outputs of said first and second means.

15. An apparatus according to claim 12, wherein the capacitance of said capacitor, the leakage reactance of said rotary transformer, and the frequency of said AC voltage form an approximately resonant condition.

16. An apparatus according to claim 12, wherein said compensating element includes a non-inductive winding formed of wires, asaid wires being of the same material as wires forming said rotary winding of said rotary transformer.

17. An apparatus according to claim 15 wherein said compensating element includes a non-inductive winding formed of wires, said wires being of the same material as the wires forming said rotary winding of said rotary transformer.

18. An apparatus according to claim 12 further including a second capacitance element connected across said capacitor and said stationary winding of said rotary transformer, and a third capacitor, said third capacitor being connected to the junction of said capacitor and said second capacitance element, the combination of said capacitor, said second capacitance element and said third capacitor forming a T-network.

19. An apparatus according to claim 18 wherein the values of the reactance of the combination of said capacitor, said second capacitance element, said third capacitor, and the leakage reactance of said rotary transformer form an approximately resonant condition.

20. An apparatus for measuring the resistance of a variable resistance element located in a rotating body, said apparatus comprising:
a bridge circuit comprising
one arm including a second capacitance element connected across a series combination of a first capacitor and a stationary winding of a rotary transformer, said transformer having a rotary winding connected across said variable resistance element, the resistance of said variable resistance element being related to a physical condition on said rotating body which is to be detected, and a third capacitor in series with the second capacitance element, said first capacitor being connected to the junction of said third capacitor and said second capacitance element, the combination of said first and third capacitors and said second capacitance element forming a T-network, and
another arm including an auxiliary resistance element for compensating for inequality in equivalent series resistance of a plurality of rotary transformers, a compensating element having approximately the same temperature co-efficient of resistance as an equivalent series resistance of said rotary transformer, and a resistance element, said compensating element being located in the proximity of said rotary transformer;
and
another two arms, one arm of which includes a detecting means for producing a signal for controlling said ambient condition and the other arm of which includes an AC voltage supply for providing an AC voltage to said bridge circuit.

21. An apparatus according to claim 20 wherein the reactance of the combination of said first and third capacitors and second capacitance element, and the leakage reactance of said rotary transformer form a resonant condition.

22. An apparatus according to claim 20 wherein said compensating element includes a non-inductive winding having wires of the same material as wires of said rotary winding of said rotary transformer.

23. An apparatus for measuring the resistance of a variable resistance element located in a rotating body, said apparatus comprising:
a circuit including
a stationary winding of a rotary transformer having a rotary winding connected across said variable resistance element, the resistance of said variable resistance element being related to a physical condition on said rotating body which is to be detected,
a combination of capacitors connected across said stationary winding, the reactance of said combination of capacitors having a value so as to form an approximately resonant condition, said combination of capacitors having a first capacitor connected in series with said stationary winding, a second capacitance element connected across said first capacitor and said stationary winding, and a third capacitor connected to the junction of said first capacitor and said second capacitance element,
a fourth capacitance element connected across said combination of capacitors,
an AC voltage supply applied to said stationary winding,
a resistance element connected across said AC voltage supply, and
a detecting means for comparing the magnitude of currents flowing through said stationary winding, said combination of capacitors and said fourth capacitance element, with the magnitude of the vector sum of said currents and a current flowing through said resistance element, said detecting means providing a signal for controlling said physical condition on said rotating body.

24. An apparatus for measuring the resistance of a variable resistance element located in a rotating body, said apparatus comprising:
a bridge circuit including
a first arm having
a stationary winding of a rotary transformer having a rotary winding connected across said variable resistance elements, the resistance of said variable resistance element being related to a physical condition on said rotating body which is to be detected,
a combination of capacitors connected across said stationary winding, the value of the reactance of said combination of capacitors forming an approximately resonant condition,
said combination of capacitors having a first capacitor connected in series with said stationary winding, a second capacitance element connected across said first capacitor and said stationary winding, and a third capacitor connected to the junction of said first capacitor and said second capacitance element,
a fourth capacitance element connected across said combination of said capacitors,
a second arm having
a series combination of a resistance element and a compensating circuit having an auxiliary resistance element and a compensating element, one end of said compensating circuit being connected to the junction of said combination of capacitors and said fourth capacitance element, said auxiliary resistance element compensating for inequality in equivalent series resistances of a plurality of rotary transformers, said compensating element having approximately the same temperature coefficient of resistance as said equivalent series resistance of said rotary transformer, said compensating element being located in proximity to said rotary transformer, and
a line having one end being open-circuited and the other end connected to the junction of said second arm and a fourth arm of said bridge circuit, a capacitance connected across said line and said compensating circuit being nearly the same value as the value of said fourth capacitance element, the third arm having a resistance element, and a fourth arm having a resistance element; and a detecting means for detecting a voltage across the junction of said first and third arms and the junction of said second and fourth arms, said detecting means producing a signal for controlling said physical condition on said rotating body; and an AC voltage being supplied to said bridge circuit.

25. An apparatus for measuring the resistance of a variable resistance element located in a rotating body said apparatus comprising:

a bridge circuit including one arm including a second capacitance element connected across a series combination of a first capacitor and a stationary winding of a rotary transformer, the values of the reactance of the combination of said second capacitance element, said first capacitor and the leakage reactance of said rotary transformer forming an approximately resonant condition, said transformer having a rotary winding connected across said variable resistance element, the resistance of said variable resistance element being related to a physical condition on said rotating body to be detected;

and another arm and, another two arms, one arm of which includes a detecting means for producing a signal for controlling said physical condition, and the other arm of which includes an AC voltage supply for providing an AC voltage to said bridge circuit.

26. An apparatus according to claim 25 wherein said other arm comprises a compensating element having approximately the same temperature coefficient of resistance as an equivalent series resistance of said rotary transformer, said compensating element being located in the proximity of said rotary transformer.

27. An apparatus according to claim 25 for use with a plurality of similar apparatuses each having a rotary transformer, wherein said other arm comprises an auxiliary resistance element for compensating for inequality in equivalent series resistance of the rotary transformers of said apparatuses.

28. An apparatus according to claim 25 for use with a plurality of similar apparatuses each having a rotary transformer, wherein said other arm comprises a compensating element having approximately the same temperature coefficient of resistance as an equivalent series resistance of said rotary transformer, and an auxiliary resistance element for compensating for inequality in equivalent series resistance of the rotary transformers of said apparatuses.

29. An apparatus according to claim 26 wherein said compensating element includes a non-inductive winding formed of wires, said wires being of the same material as wires forming said rotary winding of said transformer.

* * * * *